Patented Apr. 29, 1941

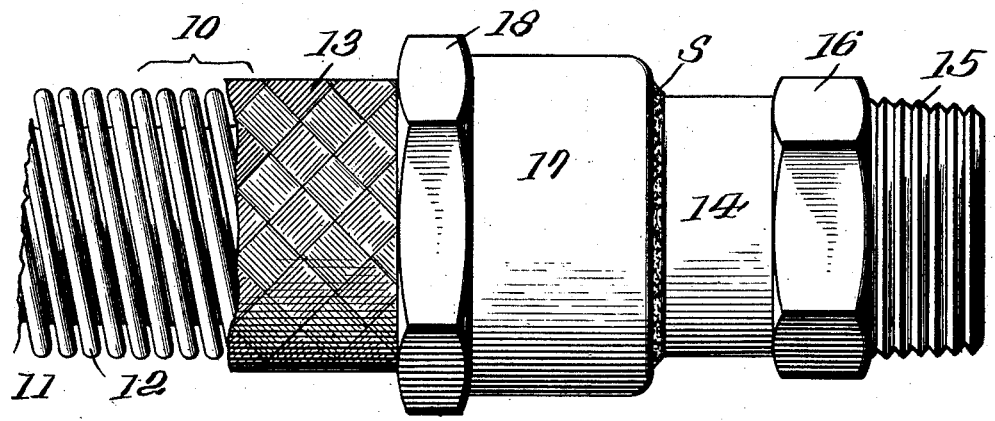
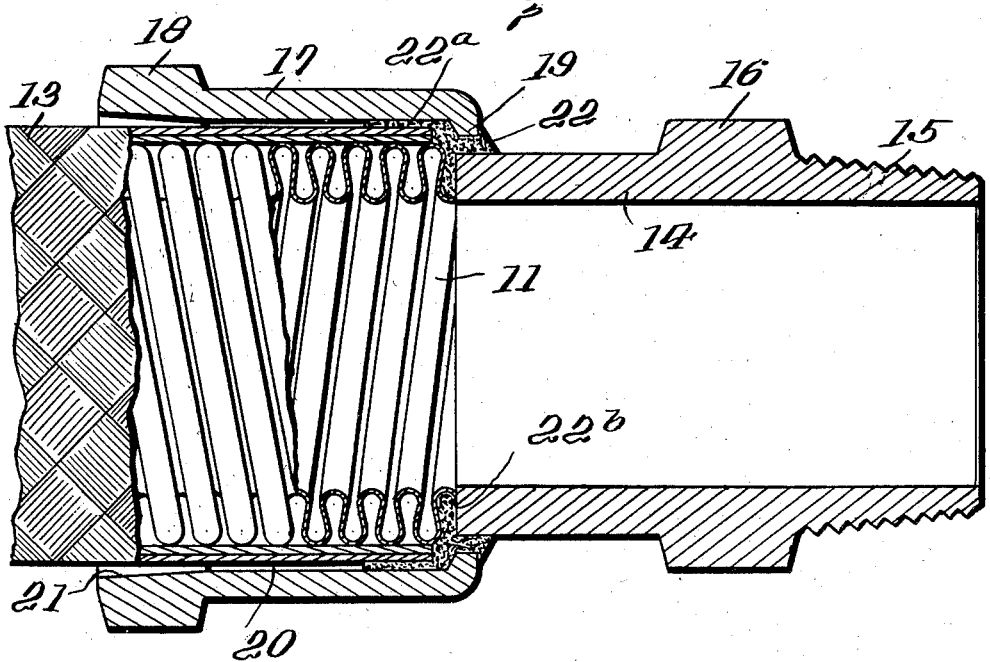

2,240,413

UNITED STATES PATENT OFFICE 2,240,413

COUPLING

Arthur L. Parker, Cleveland, Ohio

Application September 9, 1939, Serial No. 294,181

4 Claims. (Cl. 285—72)

The present invention relates to new and useful improvements in couplings or other fittings for flexible tubes, and more particularly to improvements in the connection between a coupling or other suitable fitting and a flexible hose.

According to the present invention, the flexible metal tubing or hose is connected to a coupling or other suitable fitting by solder. The fitting includes a coupling part and a sleeve portion or ferrule which may be made integral with the coupling part or which may be separately secured thereto. The flexible tubing is inserted within the sleeve portion and is suitably connected thereto, as by solder bonding. In the use of such conduit lines, the tubing is subjected to vibration so that stresses are set up therein. Heretofore it has been customary to completely fill the sleeve portion with solder so as to connect the tubing to the sleeve portion throughout the extent thereof. In couplings of this type, the stresses set up by vibration are concentrated at the open end of the sleeve portion and when these couplings fail, the breakage generally occurs at this point, that is, where the tubing is secured by solder to the sleeve portion of the coupling at the open end thereof. Similarly, bending or flexing of the tubing tends to concentrate breaking stresses at this same point.

An object of the present invention is to provide a tube coupling of the above type wherein limited movement and flexing of the tube is permitted within the coupling so as to prevent failure of the tubing by vibration stresses or by mere bending or flexing of the tubing.

Another object of the invention is to provide a tube coupling of the above type, wherein the solder connection between the tubing and the operative portion of the coupling is confined around the end of the tubing well within the sleeve portion so that a space is provided between the sleeve portion of the tubing, this space serving to permit limited flexing of the tubing within the sleeve portion in order to reduce and distribute vibration stresses.

A further object of the invention is to provide a tube coupling of the above type, wherein the solder connection affords a positive seal so as to prevent fluid reaching any portion of the tube covering.

The above and other objects of the invention will in part be obvious and will be hereinafter more fully pointed out.

In the accompanying drawing,

Figure 1 is a view showing the coupling connected to a flexible hose.

Figure 2 is a longitudinal sectional view through Figure 1.

Referring more in detail to the accompanying drawing, the flexible tubing is illustrated as being in the form of a flexible hose. This hose includes a metal conduit portion 11 having convolutions 12 which may be spiral or annular and which are covered by wire braid 13 or other suitable material.

The coupling includes a body portion 14 which is centrally bored to communicate with the metal conduit portion 11 of the hose 10. The body portion 14 of the coupling may be in the form of an elbow or T-fitting. The coupling body portion 14 is externally threaded, as at 15, at one end thereof, and is provided intermediate the ends thereof with a non-circular wrench engaging portion 16. The coupling also includes a sleeve portion or ferrule 17 which may be formed integral with the body 14 or which may be separately secured thereto as illustrated in the accompanying drawing wherein solder S is employed to connect the body and the sleeve.

The sleeve portion 17 is provided at one end thereof with a non-circular wrench-engaging portion 18 and at the opposite end thereof with an inwardly directed flange portion 19. The end of the hose 10 is fitted within the sleeve portion 17 and the metal conduit portion 11 is illustrated as extending slightly beyond the end of the covering 13, although this specific construction is not essential. The outer surface of the covering 13 is spaced inwardly from the inner surface of the sleeve portion 17, as shown at 20, and the inner surface of the sleeve portion within the non-circular wrench-engaging portion 18 is tapered outwardly, as at 21.

The end of the flexible tube 10 is secured within the sleeve portion 17 by the solder bond S. The solder is applied so that a portion 22a thereof is disposed between the wire braid covering 13 and the inner surface of the sleeve portion 17 in the region of the inturned lip 19. The solder portion 22a extends only a short distance between the covering 13 and the inner surface of the sleeve portion 17 so that the major part of the covering is spaced from the remaining portion of the sleeve portion 17. A portion 22b of the solder bond gains access to one or more of the spiral convolutions 12 so as to form with these convolutions a key connection. Thus, the flexible tube 10 is secured within the sleeve portion 17 by a solder connection which is confined around the end of the tube. A space 20 is left between the remaining inner surface of the sleeve portion 17 and the adjacent outer surface of the metal tube 10. The body portion 14 of the coupling is then sweated onto the assembly and the portion 22 of the solder bond serves to maintain the body portion connected to the metal tube and to the sleeve portion 17.

From the foregoing description, it will be seen that the present invention provides a coupling having a flexible hose wherein the coupling includes a sleeve portion and a body portion; the end of the hose extends into the sleeve portion of the coupling and is solder bonded thereto only around the end of the hose so that a space is left between the sleeve portion of the coupling and the adjacent portion of the hose. This spacing of the hose from the inner surface of the sleeve portion permits flexing of the hose above the solder connection within the sleeve portion. This permissive flexing of the hose is limited by the sleeve portion, but it serves to reduce and evenly distribute vibration stresses so as to eliminate failure of the hose at the solder connection. It will be also noted that the solder bond S provides a seal between the metal conduit portion 11 and the coupling 14 so that no fluid will reach the braid covering 13, thus preventing leakage of fluid from the assembly.

It is to be clearly understood that minor changes in the details of construction and arrangement of parts may be made without departing from the scope of the invention as set forth in the appended claims.

I claim:

1. A coupling for a flexible tube comprising a sleeve portion for receiving the inner end of the tube with the inner surface of said sleeve portion spaced from the adjacent surface of the tube whereby to permit limited flexing of the tube within the sleeve portion, a body portion having a bore communicating with the conduit portion of the tube, and a solder bond for joining the inner end of the tube to said sleeve portion and said body portion, said solder bond being restricted to a region adjacent the inner end of the tube so as to leave the tube free from bonding to the sleeve portion throughout the greater portion of the length of the sleeve portion whereby the flexing of the tube in said sleeve portion is distributed throughout the greater portion of the length of the sleeve portion.

2. A coupling for a flexible tube comprising a sleeve portion for receiving the inner end of the tube with the inner surface of said sleeve portion spaced from the adjacent surface of the tube whereby to permit limited flexing of the tube within the said sleeve portion, said sleeve portion having at the inner end thereof an inturned flange, a body portion having a bore communicating with the conduit portion of the tube, and a solder bond for joining the inner end of the tube with said sleeve portion and said body portion and in which said flange is imbedded, said solder bond being restricted to a region adjacent the inner end of the tube so as to leave the tube free from bonding to the sleeve portion throughout the greater portion of the length of the sleeve portion whereby the flexing of the tube in said sleeve portion is distributed throughout the greater portion of the length of the sleeve portion.

3. A coupling for a flexible tube comprising a sleeve portion for receiving the inner end of the tube with the inner surface of said sleeve portion spaced from the adjacent surface of the tube whereby to permit limited flexing of the tube within the sleeve portion, a body portion having a bore communicating with the conduit portion of the tube, a covering for the flexible tube, and a solder bond for joining the inner end of the tube to said sleeve portion and said body portion, said solder bond serving to prevent fluid from reaching said covering and being restricted to a region adjacent the inner end of the tube so as to leave the tube free from bonding to the sleeve portion throughout the greater portion of the length of the sleeve portion whereby the flexing of the tube in said sleeve portion is distributed throughout the greater portion of the length of the sleeve portion.

4. A coupling for a flexible tube comprising a sleeve portion for receiving the inner end of the tube with the inner surface of the sleeve portion spaced from the adjacent surface of the tube whereby to permit limited flexing of the tube within the sleeve portion, a body portion having a bore communicating with the conduit portion of the tube, a covering for the flexible tube, and a solder bond for joining the inner end of the tube to said sleeve portion and said body portion, said solder bond having a portion thereof extending a short distance between the inner surface of said sleeve portion and said covering and serving to prevent fluid from reaching said covering and being restricted to a region adjacent the inner end of the tube so as to leave the tube free from bonding to the sleeve portion throughout the greater portion of the length of the sleeve portion whereby flexing of the tube in said sleeve portion is distributed throughout the greater portion of the length of the sleeve portion.

ARTHUR L. PARKER.